United States Patent [19]

Antoniadis

[11] 4,442,580
[45] Apr. 17, 1984

[54] COIL SPRING TOOL

[76] Inventor: Dimitrios Antoniadis, 3475 Bivona St., Bronx, N.Y. 10475

[21] Appl. No.: 219,939

[22] Filed: Apr. 3, 1981

[51] Int. Cl.³ .............................................. B23P 19/04
[52] U.S. Cl. ..................................... 29/227; 267/61 S
[58] Field of Search ................. 29/227, 225; 267/61 S

[56] References Cited

U.S. PATENT DOCUMENTS 3,973,314  8/1976  Shultz ................................... 29/227
4,066,242  1/1978  Allevato ............................... 29/227

Primary Examiner—James L. Jones, Jr.
Attorney, Agent, or Firm—Hedman, Casella, Gibson, Costigan and Hoare

[57] ABSTRACT

A tool is provided for maintaining an automotive coil spring in a compressed condition during installation in an automobile chassis. The tool includes two elongated plate members each of which has an end that is curved in hook-like fashion and an end with two spaced apart apertures. A pair of parallel chain links extend through the apertures to interconnect the plates. The plates can slide along and pivot around the chain links. The curved end can grasp a spring convolution to keep the spring compressed.

4 Claims, 2 Drawing Figures

THE ENTIRE TOOL IS MADE OF FORGED STEEL

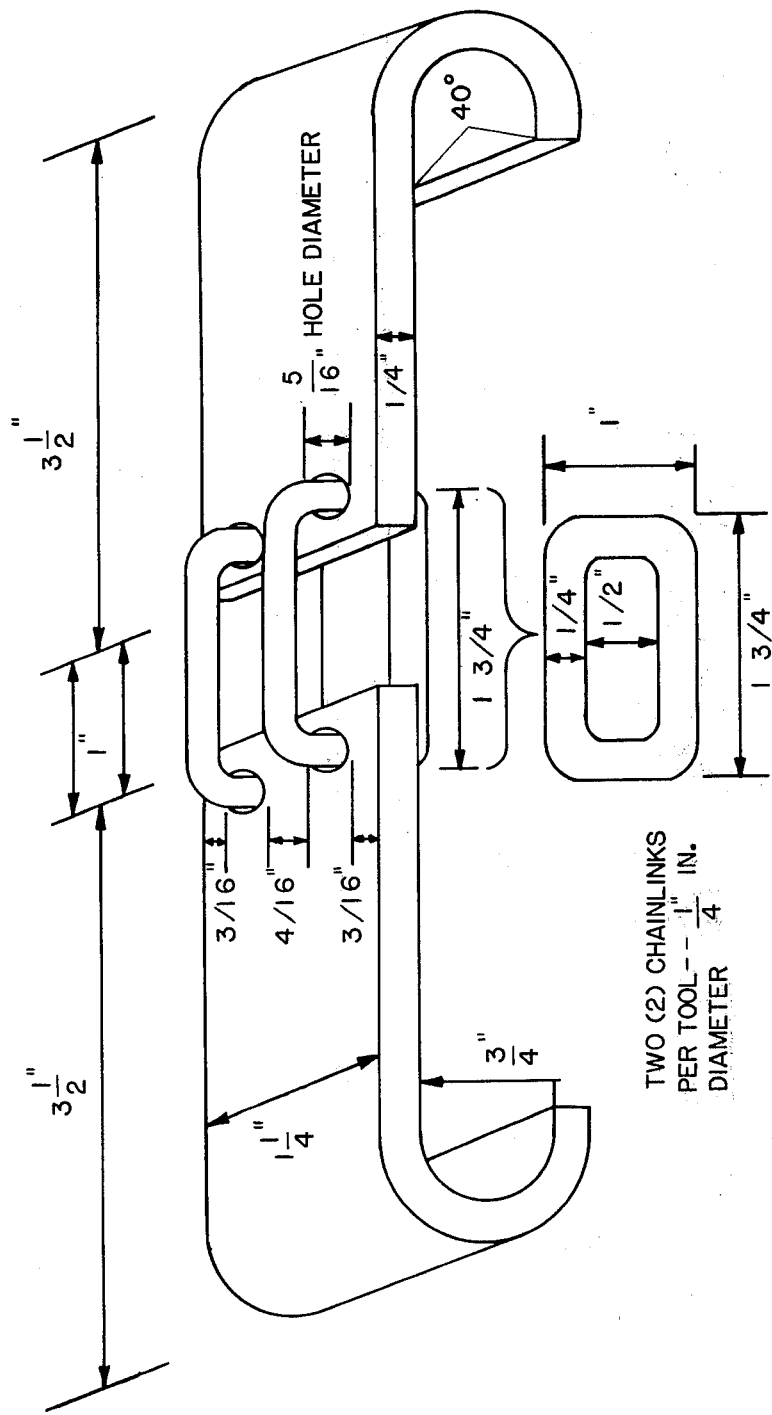

COIL SPRING TOOL

BRIEF DESCRIPTION OF THE DRAWINGS

FIG. 1 is a perspective view of the subject coil spring tool.

FIG. 2 is a plan view of the steel chain links of the tool shown in FIG. 1.

DETAILED DESCRIPTION OF THE PREFERRED EMBODIMENT

The tool 10 as shown in FIG. 1 is essentially two (2) forged steel plates 12 connected together by two (2) forged steel chain links 14. The two (2) forged steel plates 12 are equal in length, with and depth. The length of each of the forged steel plates 12 measures 3.50 of an inch. The width of each of the forged steel plates 12 measures 0.25 of an inch. The depth of each of the forged steel plates 12 measures 1.25 of an inch. On one (1) end of each of the two (2) forged steel plates 12 is a 40 degree curve 16. The 40 degree curve 16 in each of the two (2) forged steel plates 12 is what allows the assembled tool 10 to rest in a snug position on automobile coil springs as shown in FIG. 1.

On the other end 18 of each of the two (2) forged steel plates 12, is were two (2) 5/16 of an inch holes 20 will be drilled parallel to each other to allow the chain links to connect the two (2) forged steel plates 12. Each hole 20 is 3/16 of an inch from the edge of the forged steel plates 12. The two (2) forged steel plates 12 are joined together by two (2) forged steel chain links 14 which are passed through the 5/16 of an inch holes 20 which were previously drilled in the forged steel plates 14.

The forged steel chain links 14 shown most clearly in FIG. 2 measure 0.25 of an inch in diameter, 1.75 of an inch in length, and 1 inch in height. To securely connect the two (2) forged steel plates 12 with the two (2) forged steel chain links 14 as shown in FIG. 1, the chain links 14 must be passed through the steel plates 12. Once the chain links 14 have been passed through the steel plates 12, they must be welded closed. Once the chain links 14 have been welded closed, the entire tool 10 must be heated to 1000 degrees fahrenheit. Once heated the entire tool 10 is submerged in oil so that the steel molecules will constrict making the tool 10 nearly unbreakable.

The completely assembled tool measures 8 inches in length, 1.25 inches in depth, with a maximum width of 1.25 of an inch. Except for three (3) points on the tool 10, the width of the tool 10 is 0.25 of an inch. One point were the width of the tool is greater than 0.25 of an inch is that point at which the forged steel chain links 14 are located. The other points were the width of the tool 10 are greater than 0.25 of an inch are at the far ends of the tool 10. At the far ends of the tool 10, a 40 degree curve 16 can be found which has a width of 1.25 of an inch.

The coil spring tool 10 assists in making the installation of automobile coil springs for the front of American made cars easier, faster and safer. The coil spring tool 10 makes installation of automobile coil springs for the front of American made cars easier and faster due to its thin design and its structure. When the coil spring is compressed, the coil spring tool 10 gives the coil spring an excellent bend which makes installation fast and easy.

Once installation has occured, the coil spring tool 10 does not in any was hit or rub against any part of the automobile chasis making it easy for one to remove the coil spring tool 10 from the coil spring. The coil spring tool 10 is safer than most due to its strengthened structure and its design. Not only does its strengthened structure make it safe, but the coil spring tool's design enhances its safety. Since the tool 10 rests nearly perfectly on most coil springs, it has a low probability of slipping off of the coil spring.

I claim:

1. A tool for maintaining an automotive coil spring in a compressed state during installation in an automobile chassis comprising:

two elongated flat plates, each of which is curved in a hook-like fashion at one end thereof for releasably gripping a coil of said coil spring, the other end of each said plate having two spaced apart circular apertures extending therethrough generally perpendicular to the plane of said plate, the spacing between the apertures in one said plate being substantially equal to the spacing between the apertures in the other said plate, the apertures in each said plate being spaced equidistant from the respective curved end of said plate; and two substantially identical parallel chain link means having cross-sectional diameters substantially equal to said apertures respectively extending through said apertures in the elongated plates for interconnecting said plates in such manner as to form a pivoted connection therebetween with the curved ends of said plates being substantially parallel, whereby the two chain link means prevent twisting of either said elongated plate about its longitudinal axis relative to the other said elongated plate.

2. A tool for maintaining an automotive coil spring in a compressed state during installation in an automobile chassis as in claim 1 wherein each plate is formed of forged steel.

3. A tool as in claim 1 wherein each said aperture is spaced from its respective other end by approximately 3/16ths of an inch.

4. A tool as in claim 2 wherein each said forged steel chain link means is formed from steel rod material having approximately ¼ inch diameter.

* * * * *